United States Patent
Wu

(10) Patent No.: US 7,522,072 B1
(45) Date of Patent: Apr. 21, 2009

(54) SYSTEMS AND METHODS FOR MULTI-LEVEL EMBEDDED CODING AND DECODING

(75) Inventor: Huaming Wu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 11/935,095

(22) Filed: Nov. 5, 2007

(51) Int. Cl.
*H03M 7/00* (2006.01)
(52) U.S. Cl. .......................................... 341/50; 370/230
(58) Field of Classification Search ................... 341/50; 375/295, 286; 370/351, 474, 401, 346, 416, 370/230; 710/243, 244, 111, 120, 112, 113, 710/240; 709/232
See application file for complete search history.

(56) References Cited

U.S. PATENT DOCUMENTS 6,883,133 B1 * 4/2005 Gupta ........................ 714/786

FOREIGN PATENT DOCUMENTS

WO 2005020519 3/2005

OTHER PUBLICATIONS

R1-072706, Motorola, "Uplink Transmission of CQI and Ack/Nack," Jun. 2007.
R1-072755, Qualcomm Europe, "Coding Structure for CQI+ACK," Jun. 2007.
R1-071839, 3GPP TSG RAN WG1 Meeting #48bis, "LS on target quality on L1/L2 control channel," Mar. 2007.

* cited by examiner

*Primary Examiner*—Rexford Barnie
*Assistant Examiner*—Joseph Lauture
(74) *Attorney, Agent, or Firm*—Austin Rapp & Hardman

(57) ABSTRACT

A method for multi-level embedded coding may include performing multiple single-level embedded coding operations in order to code multiple types of information. Each single-level embedded coding operation may include coding a second type of information and embedding a first type of information into the coding of the second type of information. Embedding the first type of information into the coding of the second type of information may include determining a desired symbol distribution for a modulated codeword corresponding to the second type of information such that a symbol corresponding to the first type of information is more prevalent within the modulated codeword than other symbols.

22 Claims, 16 Drawing Sheets

| TYPE-1 INFORMATION 304a | DESIRED SYMBOL DISTRIBUTION 318 |
|---|---|
| 00 | 7A, 1B, 1C, 1D |
| 01 | 1A, 7B, 1C, 1D |
| 11 | 1A, 1B, 7C, 1D |
| 10 | 1A, 1B, 1C, 7D |

FIG. 3

| TYPE-2 INFORMATION 404b | CODEWORD 410 |
|---|---|
| 00000000 | 00000000000000011110 |
| ... | ... |
| 11111111 | 00000000000001111000 |

| CONDITION 648 | TYPE-1 INFORMATION DECISION 650 |
|---|---|
| $N_A$ is the largest among $N_A$, $N_B$, $N_C$, and $N_D$ | 00 |
| $N_B$ is the largest among $N_A$, $N_B$, $N_C$, and $N_D$ | 01 |
| $N_C$ is the largest among $N_A$, $N_B$, $N_C$, and $N_D$ | 11 |
| $N_D$ is the largest among $N_A$, $N_B$, $N_C$, and $N_D$ | 10 |

FIG. 6

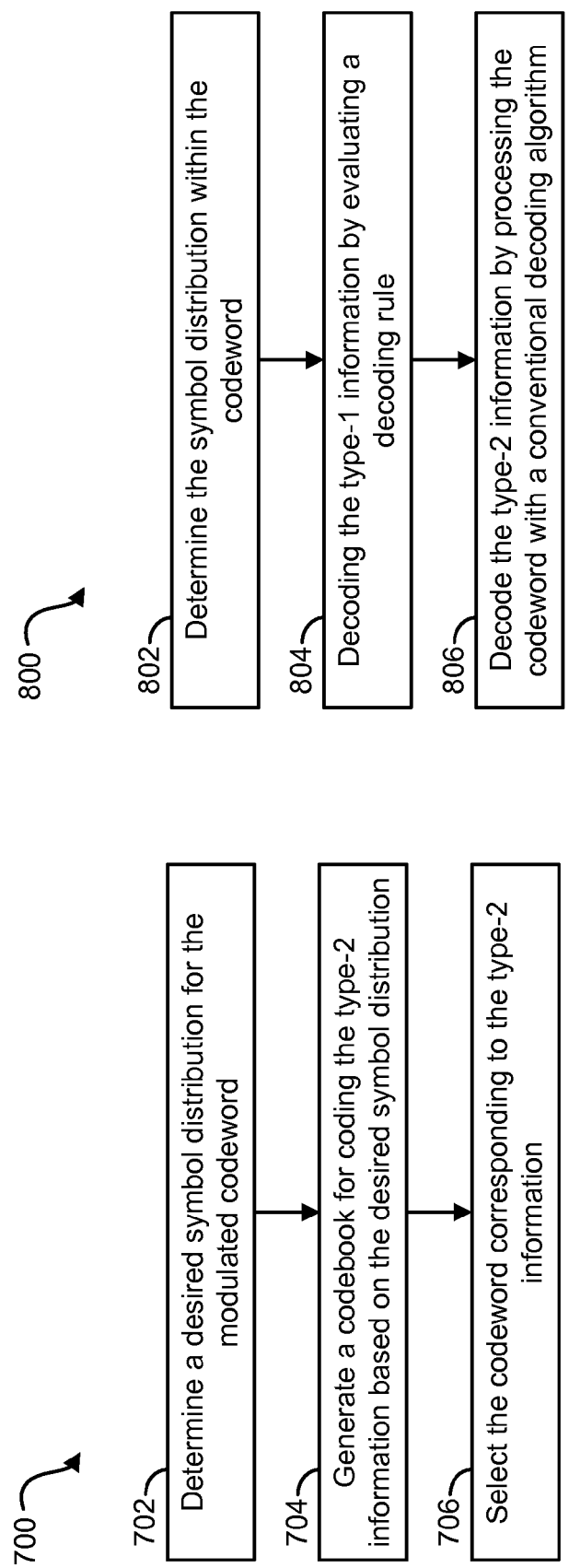

SYSTEMS AND METHODS FOR MULTI-LEVEL EMBEDDED CODING AND DECODING

TECHNICAL FIELD

The present disclosure relates generally to wireless communication systems. More specifically, the present disclosure relates to systems and methods for multi-level embedded coding.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality.

In the context of a wireless communication system, the term "user equipment" (UE) refers to any device that may be used by an end user to communicate. UEs may be stationary or mobile, and may alternatively be referred to as mobile stations, stations, user terminals, access terminals, terminals, subscriber units, etc. Some examples of UEs include cellular phones, wireless devices, personal digital assistants (PDAs), handheld devices, wireless modems, laptop computers, etc.

Each UE may communicate with one or more base stations (which may alternatively be referred to as access points, Node Bs, etc.) via transmissions on the uplink and the downlink. The uplink (or reverse link) refers to the communication link from the UEs to the base stations, and the downlink (or forward link) refers to the communication link from the base stations to the UEs.

Typically, there are multiple types of control information transmitted from a UE to a base station in the uplink of a wireless communication system. For example, the control information may include a channel quality indicator (CQI) and an acknowledgement/non-acknowledgement (ACK/NACK). In the case of a multiple antenna communication system, the control information may also include a pre-coding matrix indicator (PMI) and rank information. The examples of control information that were just mentioned (CQI, ACK/NACK, PMI, and rank information) may be considered to be a feedback report with respect to the downlink transmission. The control information may be transmitted via a control signaling channel.

As indicated above, the present disclosure relates generally to wireless communication systems. More specifically, the present disclosure relates to systems and methods for multi-level embedded coding.

BRIEF DESCRIPTION OF THE DRAWINGS

FIG. 3 illustrates an example of desired symbol distributions for different values of type-1 information;

FIG. 4 illustrates an example of a codebook;

FIG. 6 illustrates an example of a decoding rule;

FIG. 7 illustrates an example of a method for single-level embedded coding;

FIG. 8 illustrates an example of a method for single-level embedded decoding;

DETAILED DESCRIPTION

Figure 1:
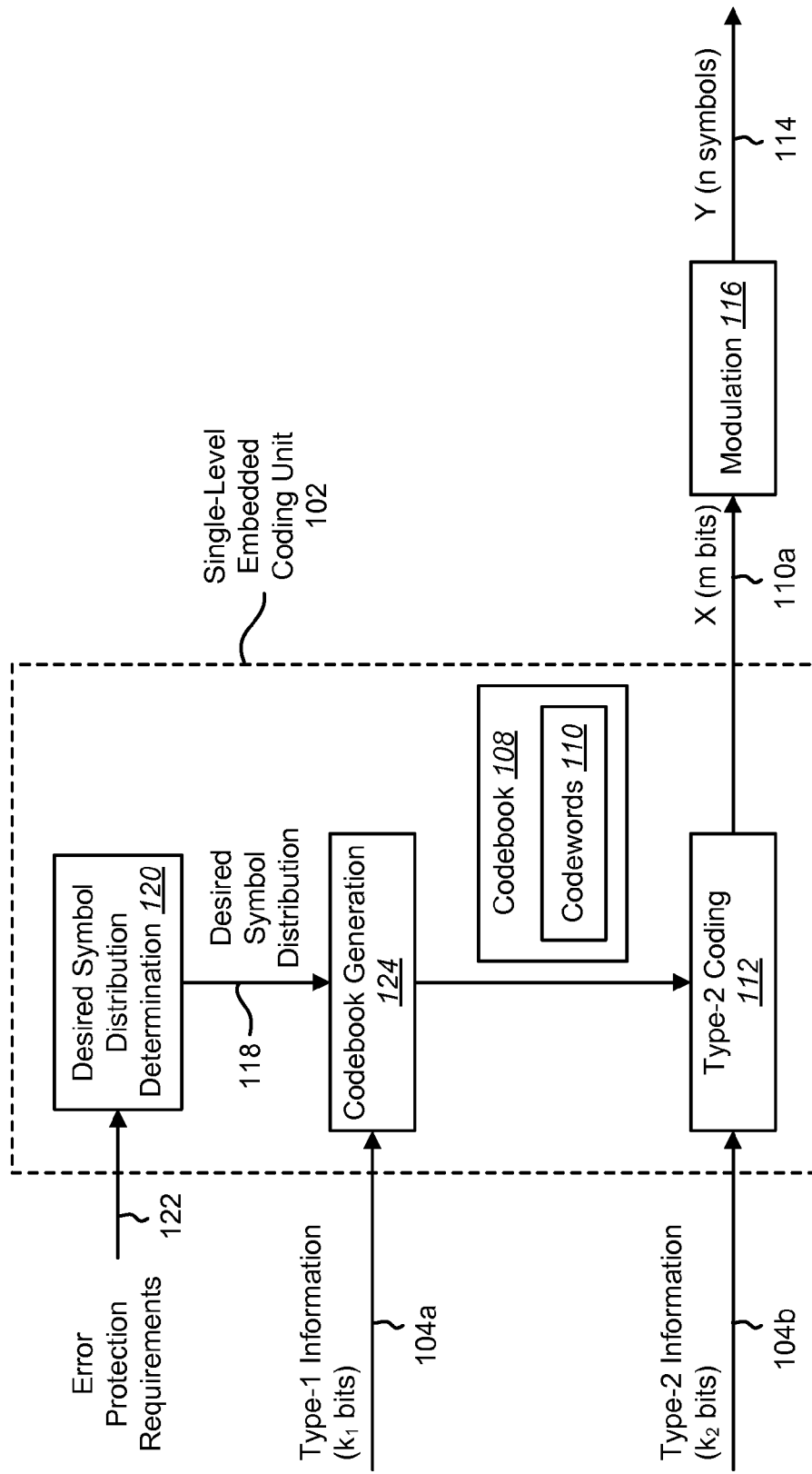
FIG. 1 illustrates an example of a single-level embedded coding unit.

A method for multi-level embedded coding is disclosed. The method may include performing multiple single-level embedded coding operations in order to code multiple types of information. Each single-level embedded coding operation may include embedding a first type of information into a codeword for the second type of information. Embedding the first type of information into the codeword for the second type of information may include determining a desired symbol distribution for a modulated codeword corresponding to the second type of information, and generating a codebook for coding the second type of information by choosing codewords that have the desired symbol distribution when modulated.

The multiple single-level embedded coding operations may be performed in a serial order. Alternatively, the multiple single-level embedded coding operations may be performed partially in parallel.

The method may be implemented by a wireless device. The multiple types of information may have different error protection requirements. The multiple types of information may include control information that is transmitted to a base station. The control information may include an acknowledgement/non-acknowledgement (ACK/NACK), a channel quality indicator (CQI), a pre-coding matrix indicator (PMI), rank information, and a scheduling request (SR).

The multiple single-level embedded coding operations may include a single-level embedded coding operation in which the first type of information is a combination of a scheduling request (SR) and an acknowledgement/non-acknowledgement (ACK/NACK), and the second type of information is a channel quality indicator (CQI).

The multiple single-level embedded coding operations may include a first single-level embedded coding operation in which the first type of information is rank information, and the second type of information is a pre-coding matrix indicator (PMI). The multiple single-level embedded coding operations may also include a second single-level embedded coding operation in which the first type of information is a result of the first single-level embedded coding operation, and the second type of information is a channel quality indicator (CQI).

The multiple single-level embedded coding operations may include a first single-level embedded coding operation in which the first type of information is a combination of a scheduling request (SR) and an acknowledgement/non-acknowledgement (ACK/NACK), and the second type of information is rank information. The multiple single-level embedded coding operations may also include a second single-level embedded coding operation in which the first type of information is a pre-coding matrix indicator (PMI), and the second type of information is a channel quality indicator (CQI). The multiple single-level embedded coding operations may also include a third single-level embedded coding operation in which the first type of information is a first level-1 codeword that results from the first single-level embedded coding operation, and the second type of information is a second level-1 codeword that results from the second single-level embedded coding operation.

A wireless device that is configured for multi-level embedded coding is also disclosed. The wireless device includes a processor and memory in electronic communication with the processor. Instructions may be stored in the memory. The instructions may be executable to perform multiple single-level embedded coding operations in order to code multiple types of information. Each single-level embedded coding operation may include embedding a first type of information into a codeword for the second type of information. Embedding the first type of information into the codeword for the second type of information may include determining a desired symbol distribution for a modulated codeword corresponding to the second type of information, and generating a codebook for coding the second type of information by choosing codewords that have the desired symbol distribution when modulated.

A computer-readable medium including executable instructions is also disclosed. The computer-readable medium may include instructions for performing multiple single-level embedded coding operations in order to code multiple types of information. Each single-level embedded coding operation may include embedding a first type of information into a codeword for the second type of information. Embedding the first type of information into the codeword for the second type of information may include determining a desired symbol distribution for a modulated codeword corresponding to the second type of information, and generating a codebook for coding the second type of information by choosing codewords that have the desired symbol distribution when modulated.

A method for multi-level embedded decoding is also disclosed. The method includes performing multiple single-level embedded decoding operations in order to decode multiple types of information. Each single-level embedded decoding operation may include decoding a first type of information and a second type of information. Decoding the first type of information may include determining a symbol distribution within a codeword that corresponds to the second type of information and evaluating a decoding rule that depends on the symbol distribution.

FIG. 1 illustrates an example of a single-level embedded coding unit 102. The single-level embedded coding unit 102 performs a single-level embedded coding operation that involves a first type of information 104*a* (type-1 information 104*a*) and a second type of information 104*b* (type-2 information 104*b*). More specifically, the single-level embedded coding operation involves embedding the type-1 information 104*a* into a codeword 110*a* for the type-2 information 104*b*.

A codebook 108 may be used to code the type-2 information 104*b*. The codebook 108 may include a codeword 110 for each possible value of the type-2 information 104*b*. Coding the type-2 information 104*b* may involve selecting the codeword 110*a* corresponding to the type-2 information 104*b* from among the codewords 110 in the codebook 108. A type-2 coding component 112 is shown in FIG. 1 for providing this functionality.

The selected codeword 110*a* may then be modulated. A modulation component 116 is shown in FIG. 1 for providing this functionality. Modulating the selected codeword 110*a* results in a modulated codeword 114. The selected codeword 110*a* is labeled X in FIG. 1, and the modulated codeword 114 is labeled Y.

As part of embedding the type-1 information 104*a* into the codeword 110*a* for the type-2 information 104*b*, the desired symbol distribution 118 for the modulated codeword 114 (i.e., the desired occurrence of symbols within the modulated codeword 114) may be determined. A desired symbol distribution determination component 120 is shown in FIG. 1 for providing this functionality.

The desired symbol distribution 118 may be determined such that the number of a specific symbol is different than the number of any of the other symbols in the modulated codeword 114. Error protection requirements 122 of the type-1 information 104*a* and the type-2 information 104*b* may also be considered as part of determining the desired symbol distribution 118. In particular, the desired symbol distribution 118 may be determined so as to meet error protection requirements 122 of the type-1 information 104*a* and the type-2 information 104*b*.

In general, by embedding the type-1 information 104*a* into the type-2 codeword 110*a*, higher error protection may be provided to the type-1 information 104*a* than to the type-2 information 104*b*. Furthermore, the error protection levels for the type-1 information 104*a* and the type-2 information 104*b* may be controlled by choosing different desired symbol distributions 118.

Once the desired symbol distribution 118 has been determined, the codebook 108 may be generated based on the desired symbol distribution 118. Codewords 110 that will have the desired symbol distribution 118 when modulated may be chosen for the codebook 108. A codebook generation component 124 is shown in FIG. 1 for providing this functionality.

Figure 2:
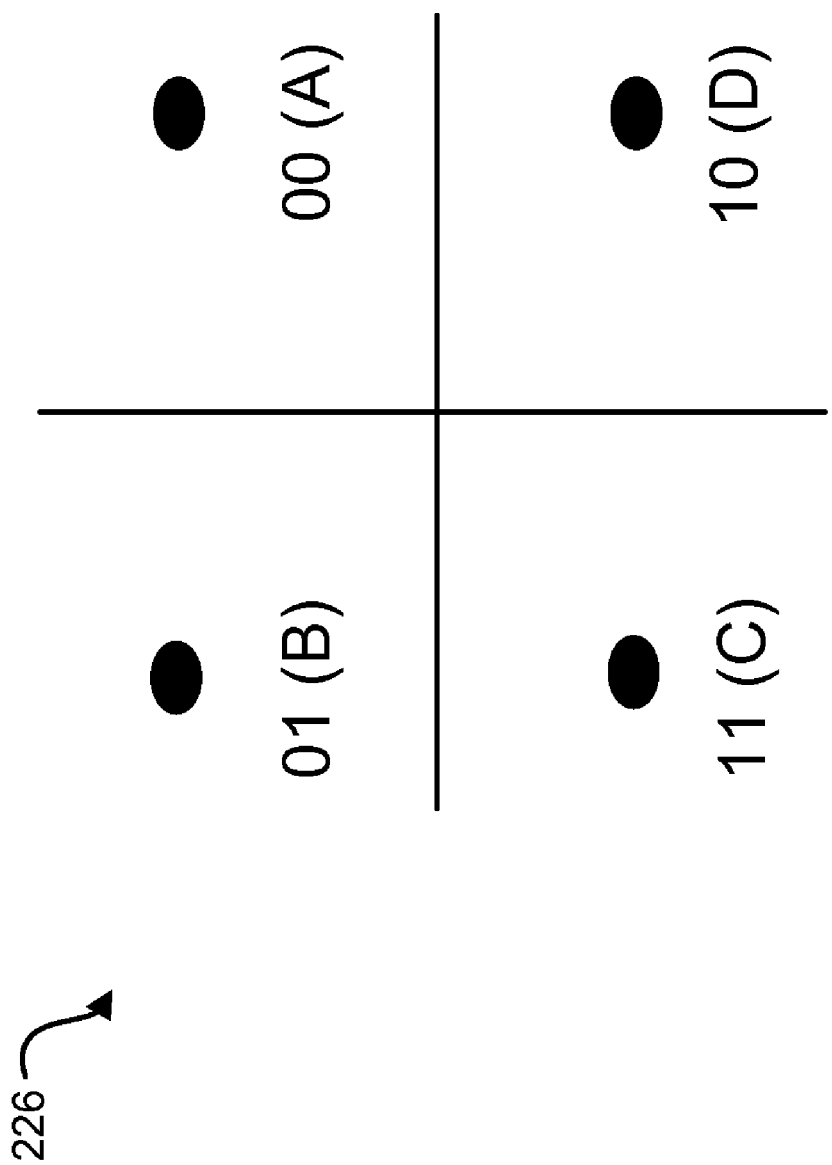
FIG. 2 illustrates an example of a quadrature phase shift keying (QPSK) constellation.

FIG. 2 illustrates an example of a quadrature phase shift keying (QPSK) constellation 226. The four symbols are labeled as A, B, C, and D, respectively.

FIG. 3 illustrates an example of desired symbol distributions 318 for different values of type-1 information 304*a*. For purposes of this example, it is assumed that the type-1 information 304*a* includes 2 bits and the type-2 information 404*b* contains 8 bits, that the codeword 110 includes 20 bits, that QPSK is used as the modulation scheme, and that the modulated codeword 114 includes 10 symbols.

In this example, the desired symbol distributions 118 are determined such that a specific symbol occurs seven times in the modulated codeword 114, and each other symbol occurs only once. For example, when the type-1 information 304*a*(1) is "00", the desired symbol distribution 318*a* is seven A symbols, one B symbol, one C symbol, and one D symbol.

The desired symbol distributions 318 shown in FIG. 3 are provided for purposes of example only. Other symbol distributions 318 may be used. In general, a symbol distribution 318 may be used as long as the number of different ordering of that symbol distribution (i.e., the number of possible combinations that result from the symbol distribution 318) is larger than the number of all possible values of the type-2 information 104b. For example, having one A symbol, three B symbols, three C symbols, and three D symbols is another possible desired symbol distribution 318. In general, the larger the unevenness of the desired symbol distribution 318, the greater error protection that is provided for the type-1 information 304a.

FIG. 4 illustrates an example of a codebook 408 that may be generated if the type-1 information 304a(1) is "00", if the type-2 information 404b includes 8 bits, if the codeword 410 includes 20 bits, if QPSK is used as the modulation scheme, and if the symbol distribution is as shown in FIG. 3.

The codebook 408 includes codewords 410 for each possible value of the type-2 information 404b. Each codeword 410 will have the desired symbol distribution 318a shown in FIG. 3 when it is modulated. For example, when the codeword 410a that corresponds to the type-2 information 404b (1) "00000000" is modulated, the resulting modulated codeword 114 will be AAAAAAABCD. When the codeword 410b that corresponds to the type-2 information 404b(2) "11111111" is modulated, the resulting modulated codeword 114 will be AAAAAABCDA.

Figure 5:
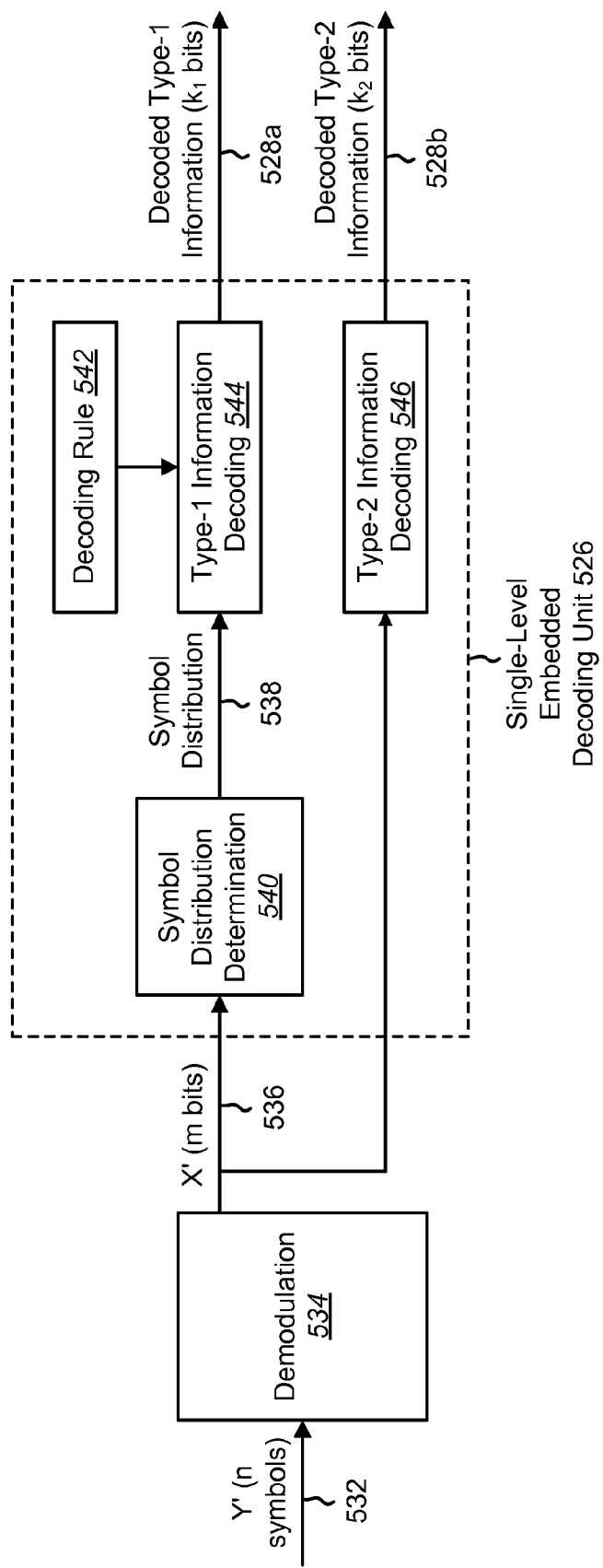
FIG. 5 illustrates an example of a single-level embedded decoding unit.

FIG. 5 illustrates an example of a single-level embedded decoding unit 526. The single-level embedded decoding unit 526 performs a single-level embedded decoding operation that involves decoding a first type of information 528a (type-1 information 528a) and a second type of information 528b (type-2 information 528b).

A received signal may include a modulated codeword 532, which is labeled Y' in FIG. 5. The modulated codeword 532 may be demodulated. A demodulation component 534 is shown in FIG. 5 for providing this functionality. Demodulating the modulated codeword 532 may result in a codeword 536, which is labeled X' in FIG. 5. The codeword 536 corresponds to the type-2 information 528b.

The symbol distribution 538 within the codeword 536 may also be determined. A symbol distribution determination component 540 is shown in FIG. 5 for providing this functionality.

The type-1 information 528a may be decoded by evaluating a decoding rule 542 that depends on the symbol distribution 538 within the codeword 536. A type-1 information decoding component 544 is shown in FIG. 5 for providing this functionality.

The type-2 information 528b may be decoded by processing the codeword 536 in accordance with a conventional decoding algorithm (e.g., maximum likelihood detection). A type-2 information decoding component 546 is shown in FIG. 5 for providing this functionality.

FIG. 6 illustrates an example of a decoding rule 642. The decoding rule 642 includes multiple conditions 648. For each condition, the decoding rule 642 includes a type-1 information decision 650.

FIG. 7 illustrates an example of a method 700 for single-level embedded coding. The method 700 may be performed by a single-level embedded coding unit 102 in order to embed type-1 information 104a into the codeword 110a for the type-2 information 104b.

The method 700 may include determining 702 the desired symbol distribution 118 for a modulated codeword 114 corresponding to the type-2 information 104b. The desired symbol distribution 118 may be determined 702 such that the number of a specific symbol is different than the number of any of the other symbols in the modulated codeword 114.

Error protection requirements 122 of the type-1 information 104a and the type-2 information 104b may also be considered as part of determining 702 the desired symbol distribution 118.

The method 700 may also include generating 704 a codebook 108 for coding the type-2 information 104b based on the desired symbol distribution 118. This may involve choosing codewords 110 for the codebook 108 that will have the desired symbol distribution 118 when modulated. The method 700 may also include selecting 706 the codeword 110 corresponding to the type-2 information 104b from the codewords 110 in the codebook 108.

FIG. 8 illustrates an example of a method 800 for single-level embedded decoding. The method 800 may be performed by a single-level embedded decoding unit 526 in order to type-1 information 528a and type-2 information 528b.

The method 800 may include determining 802 the symbol distribution 538 within a codeword 536. The method 800 may also include decoding 804 the type-1 information 528a by evaluating a decoding rule 542 that depends on the symbol distribution 538. The method 800 may also include decoding 806 the type-2 information 528b by processing the codeword 536 in accordance with a conventional decoding algorithm (e.g., maximum likelihood detection).

Figure 9:
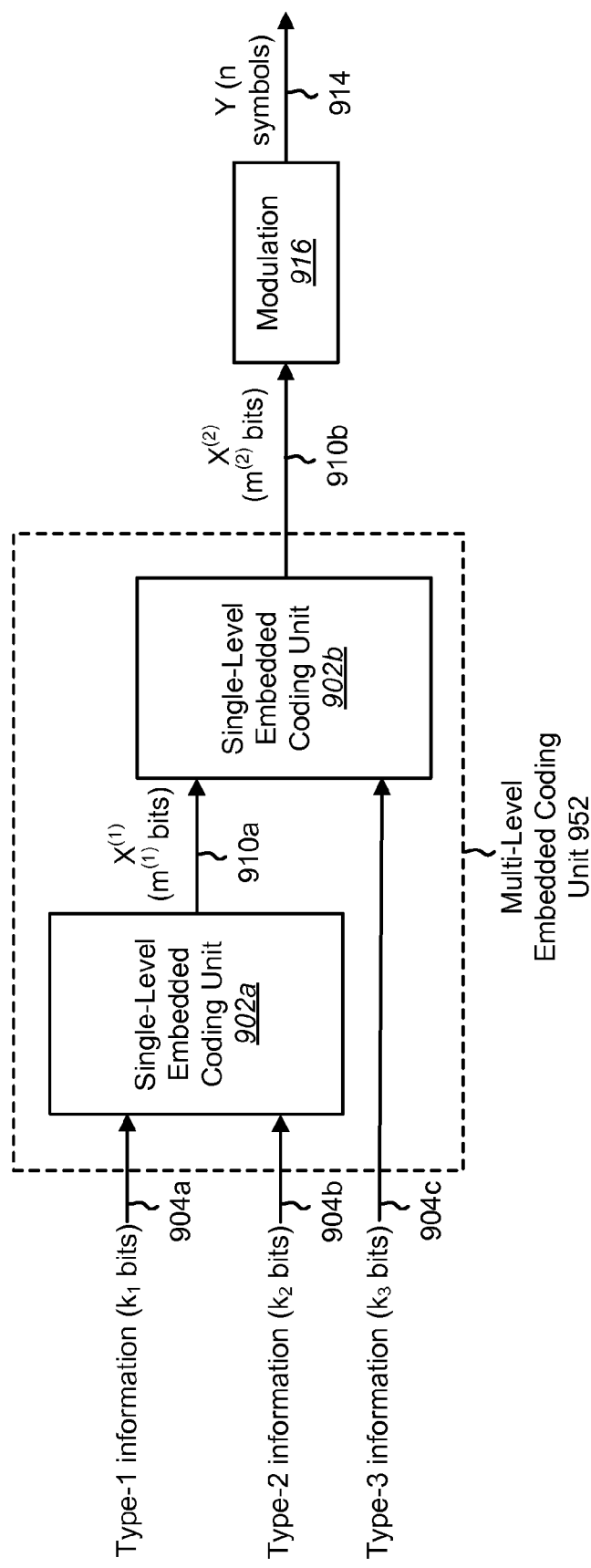
FIG. 9 illustrates an example of a multi-level embedded coding unit.

FIG. 9 illustrates an example of a multi-level embedded coding unit 952. The multi-level embedded coding unit 952 performs two single-level embedded coding operations in order to code three different types of information.

A first single-level embedded coding operation may be performed with respect to the type-1 information 904a and the type-2 information 904b. A first single-level embedded coding unit 902a is shown in FIG. 9 for providing this functionality. The result of the first single-level embedded coding operation may be a level-1 codeword 910a, which is labeled $X^{(1)}$ in FIG. 9.

A second single-level embedded coding operation may be performed with respect to the level-1 codeword 910a and a third type of information 904c (type-3 information 904c). A second single-level embedded coding unit 902b is shown in FIG. 9 for providing this functionality. The result of the second single-level embedded coding operation may be a level-2 codeword 910b, which is labeled $X^{(2)}$ in FIG. 9.

The level-2 codeword 910b may be modulated. A modulation component 916 is shown in FIG. 9 for providing this functionality. The result of modulating the level-2 codeword 910b may be a modulated codeword 914, which is labeled Y in FIG. 9.

The three different types of information 904a, 904b, 904c may have different error protection requirements 122. For example, the error protection requirements 122 for the type-1 information 904a may be greater than the error protection requirements 122 for the type-2 information 904b, and the error protection requirements 122 for the type-2 information 904b may be greater than the error protection requirements 122 for the type-3 information 904c.

The sizes of the first codeword 910a and the second codeword 910b may be determined with consideration of error protection requirements 122 for all types of information 904a, 904b, 904c.

Figure 10:
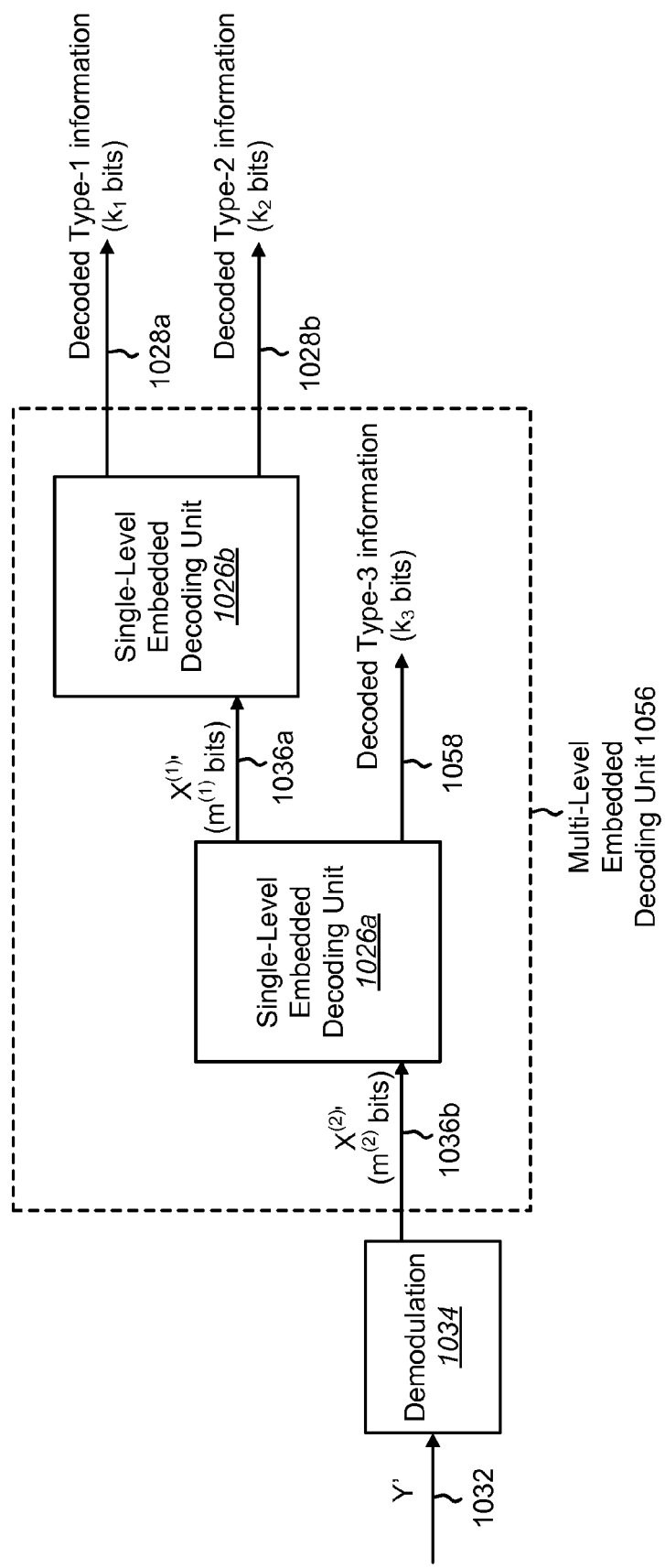
FIG. 10 illustrates an example of a multi-level embedded decoding unit.

FIG. 10 illustrates an example of a multi-level embedded decoding unit 1056. The multi-level embedded decoding unit 1056 performs two single-level embedded decoding operations in order to decode three different types of information.

A modulated codeword 1032 within a received signal may be demodulated in order to obtain a level-2 codeword 1036b.

A demodulation component 1034 is shown in FIG. 10 for providing this functionality. The level-2 codeword 1036b is labeled $X^{(2)}$ in FIG. 10.

A first single-level embedded decoding operation may be performed with respect to the level-2 codeword 1036b. A first single-level embedded decoding unit 1026a is shown in FIG. 10 for providing this functionality. The first single-level embedded decoding operation results in decoded type-3 information 1058 and a level-1 codeword 1036a. The level-1 codeword 1036a is labeled $X^{(1)}$.

A second single-level embedded decoding operation may be performed with respect to the level-1 codeword 1036a. A second single-level embedded decoding unit 1026b is shown in FIG. 10 for providing this functionality. The second single-level embedded decoding operation results in decoded type-1 information 1028a and decoded type-2 information 1028b.

Figure 11:
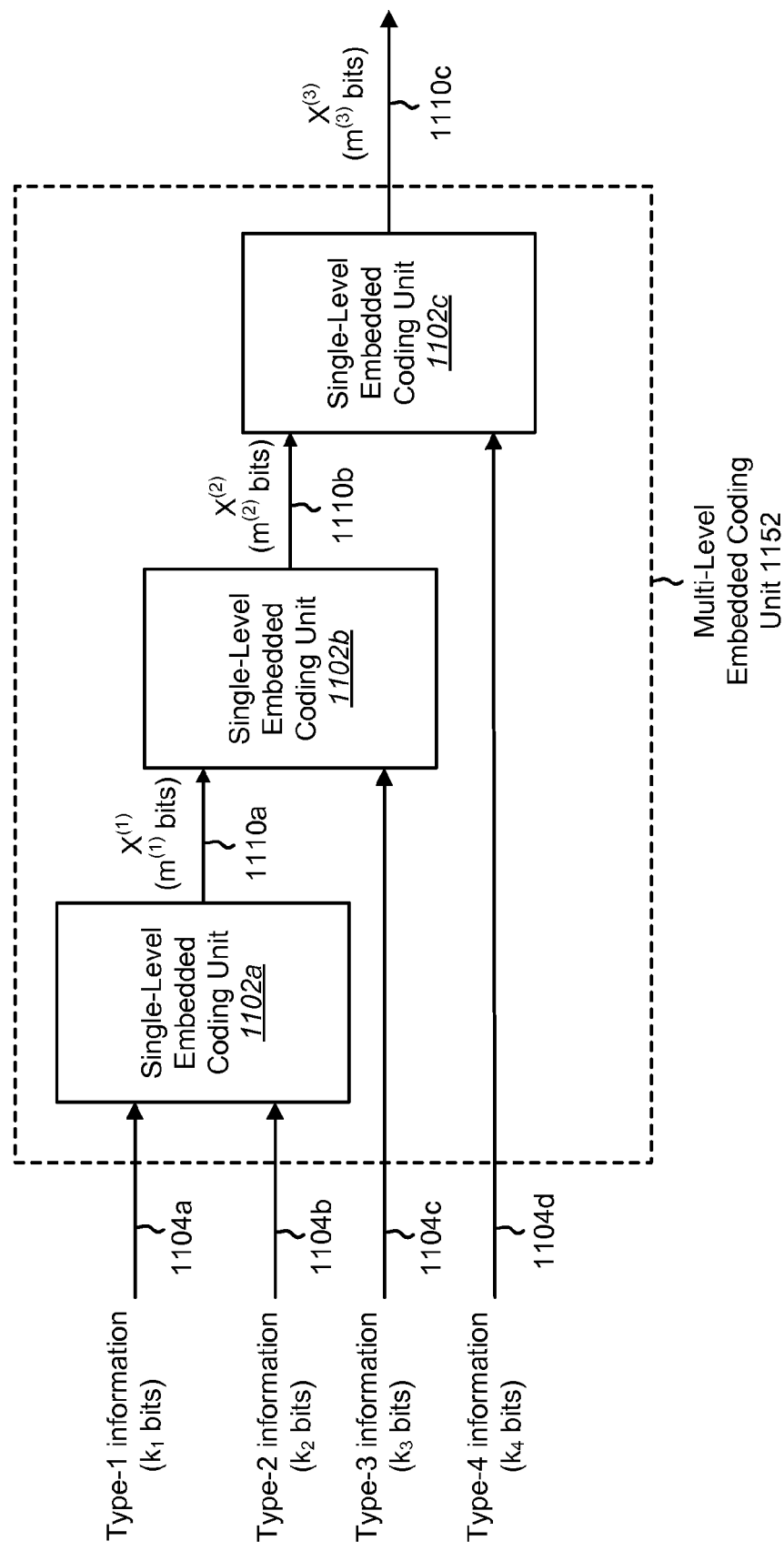
FIG. 11 illustrates another example of a multi-level embedded coding unit.

FIG. 11 illustrates another example of a multi-level embedded coding unit 1152. The multi-level embedded coding unit 1152 performs three single-level embedded coding operations in order to code four different types of information.

A first single-level embedded coding operation may be performed with respect to type-1 information 1104a and type-2 information 1104b. A first single-level embedded coding unit 1102a is shown in FIG. 11 for providing this functionality. The result of the first single-level embedded coding operation may be a level-1 codeword 1110a, which is labeled $X^{(1)}$ in FIG. 11.

A second single-level embedded coding operation may be performed with respect to the level-1 codeword 1110a and a third type of information 1104c (type-3 information 1104c). A second single-level embedded coding unit 1102b is shown in FIG. 11 for providing this functionality. The result of the second single-level embedded coding operation may be a level-2 codeword 1110b, which is labeled $X^{(2)}$ in FIG. 11.

A third single-level embedded coding operation may be performed with respect to the level-2 codeword 1110b and a fourth type of information 1104d (type-4 information 1104d). A third single-level embedded coding unit 1102c is shown in FIG. 11 for providing this functionality. The result of the third single-level embedded coding operation may include a level-3 codeword 1110c, which is labeled $X^{(3)}$ in FIG. 11.

The multi-level embedded coding operations that are performed by the multi-level embedded coding unit 1152 shown in FIG. 11 may be performed in a serial order. In other words, the first multi-level embedded coding operation may be performed first, resulting in the level-1 codeword 1110a. Then the second multi-level embedded coding operation may be performed, resulting in the level-2 codeword 1110b. Then the third multi-level embedded coding operation may be performed, resulting in the level-3 codeword 1110c.

Figure 12:
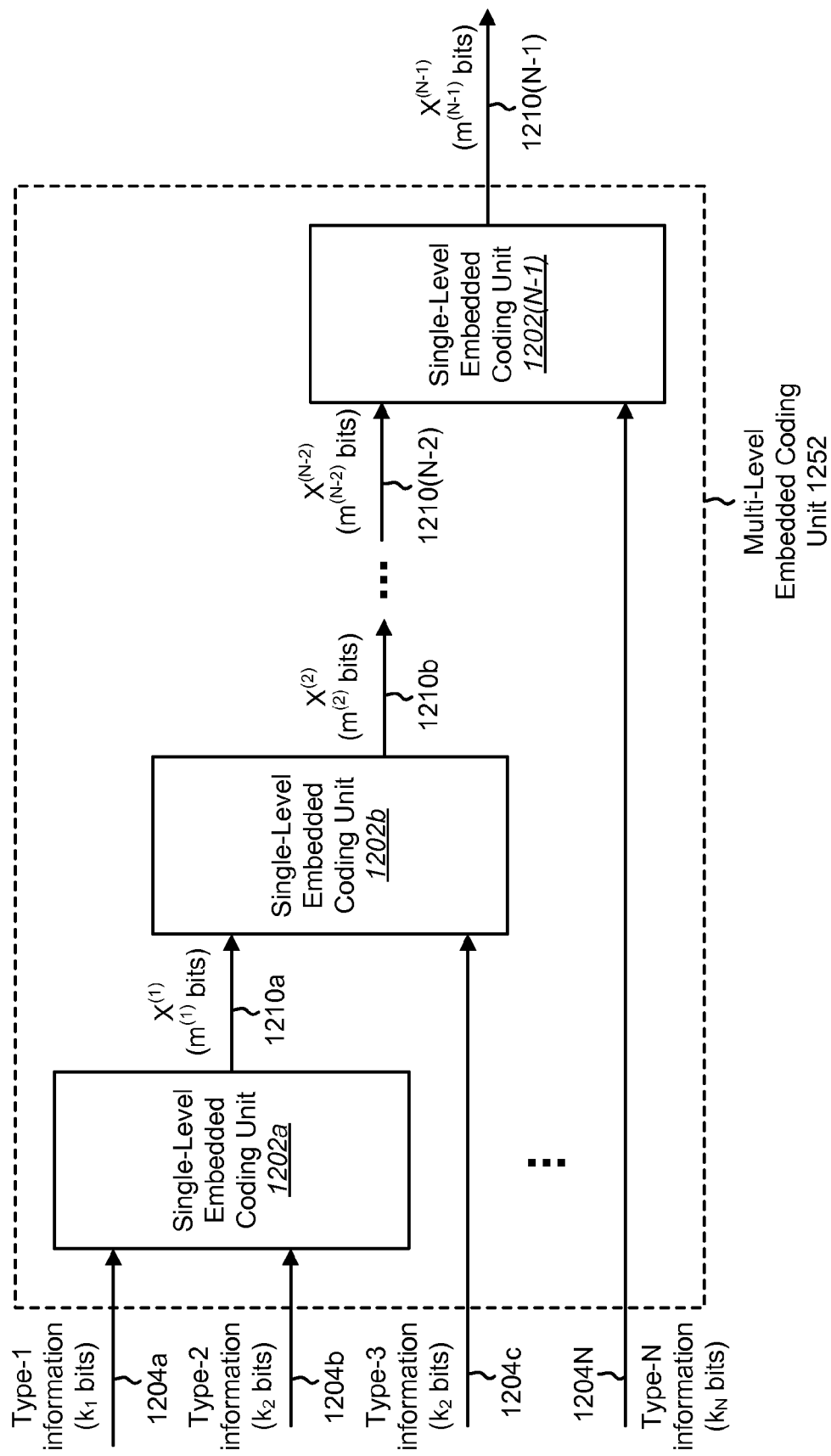
FIG. 12 illustrates another example of a multi-level embedded coding unit.

FIG. 12 illustrates another example of a multi-level embedded coding unit 1252. The multi-level embedded coding unit 1252 performs N−1 single-level embedded coding operations in order to code N different types of information.

A first single-level embedded coding operation may be performed with respect to type-1 information 1204a and type-2 information 1204b. A first single-level embedded coding unit 1202a is shown in FIG. 12 for providing this functionality. The result of the first single-level embedded coding operation may be a level-1 codeword 1210a, which is labeled $X^{(1)}$ in FIG. 12.

A second single-level embedded coding operation may be performed with respect to the level-1 codeword 1210a and a third type of information 1204c (type-3 information 1204c). A second single-level embedded coding unit 1202b is shown in FIG. 12 for providing this functionality. The result of the second single-level embedded coding operation may be a level-2 codeword 1210b, which is labeled $X^{(2)}$ in FIG. 12.

An (N−1)st single-level embedded coding operation may be performed with respect to a level-(N−2) codeword 1210 (N−2) and an Nth type of information 1204N (type-N information 1204N). An (N−1)st single-level embedded coding unit 1202(N−1) is shown in FIG. 12 for providing this functionality. The result of the (N−1)st single-level embedded coding operation may include a level-(N−1) codeword 1210 (N−1), which is labeled $X^{(N-1)}$ in FIG. 12.

Figure 13:
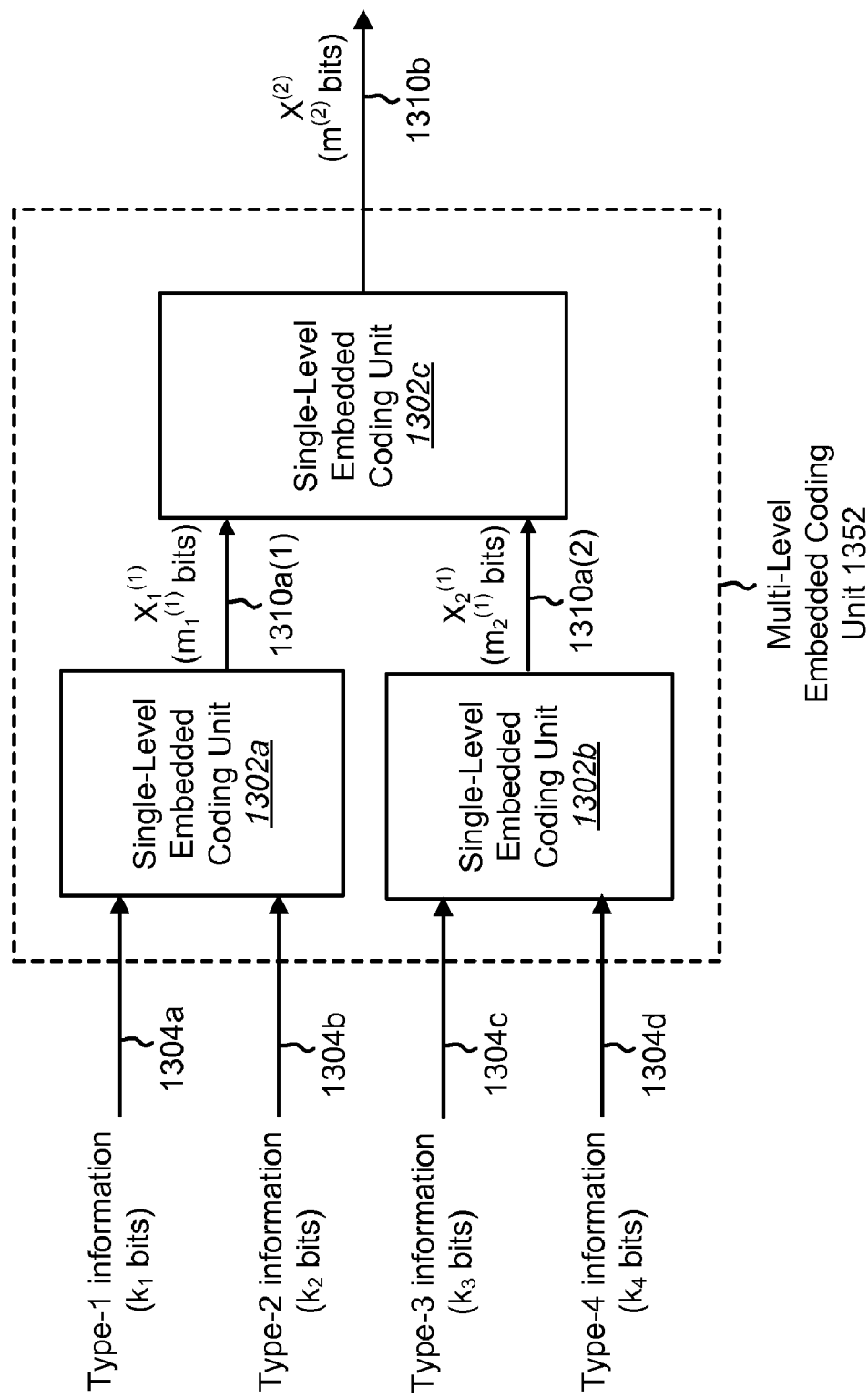
FIG. 13 illustrates another example of a multi-level embedded coding unit.

FIG. 13 illustrates another example of a multi-level embedded coding unit 1352. The multi-level embedded coding unit 1352 performs three single-level embedded coding operations in order to code four different types of information.

A first single-level embedded coding operation may be performed with respect to type-1 information 1304a and type-2 information 1304b. A first single-level embedded coding unit 1302a is shown in FIG. 13 for providing this functionality. The result of the first single-level embedded coding operation may be a first level-1 codeword 1310a(1), which is labeled $X_1^{(1)}$ in FIG. 13.

A second single-level embedded coding operation may be performed with respect to type-3 information 1304c and type-4 information 1304d. A second single-level embedded coding unit 1302b is shown in FIG. 13 for providing this functionality. The result of the second single-level embedded coding operation may be a second level-1 codeword 1310a(2), which is labeled $X_2^{(1)}$ in FIG. 13.

Compared to the example in FIG. 11, note that the first and second single-level embedded coding operations may be performed in a parallel way to speed up the coding. Stated another way, the multiple single-level embedded coding operations performed by the multi-level embedded coding unit 1352 shown in FIG. 13 may be performed partially in parallel.

A third single-level embedded coding operation may be performed with respect to the first level-1 codeword 1310a(1) and the second level-1 codeword 1310a(2). A third single-level embedded coding unit 1302c is shown in FIG. 13 for providing this functionality. The result of the third single-level embedded coding operation may be a level-2 codeword 1310b, which is labeled $X^{(2)}$ in FIG. 13.

Figure 14:
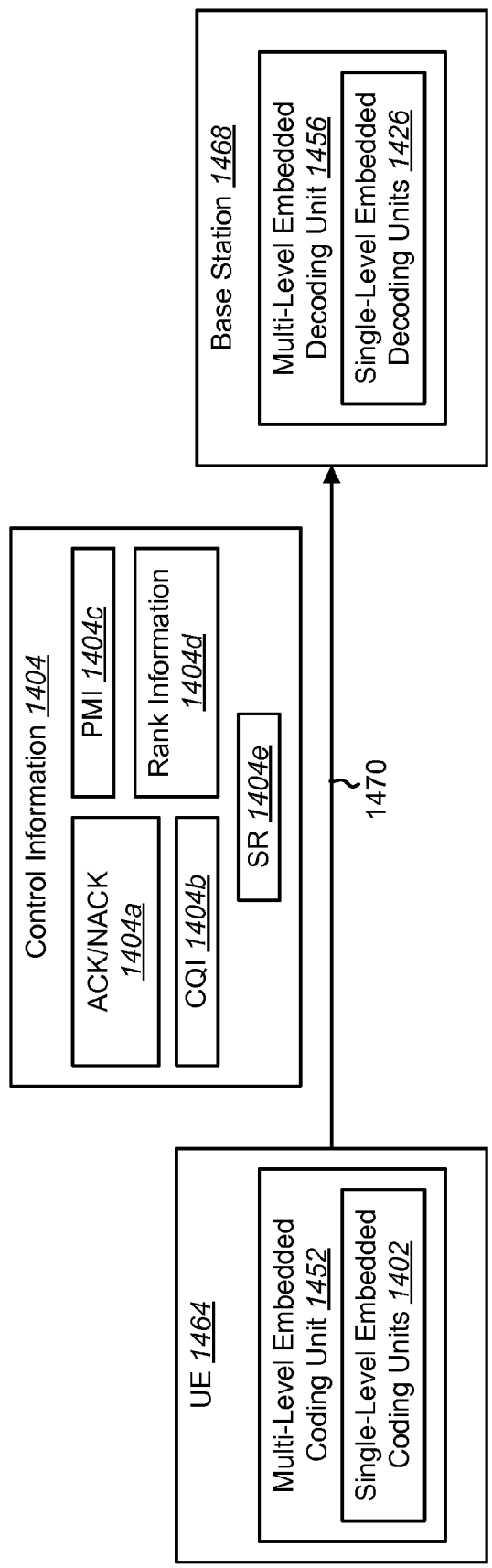
FIG. 14 illustrates a user equipment (UE) transmitting control information to a base station.

FIG. 14 illustrates a user equipment (UE) 1464 transmitting control information 1466 to a base station 1468 via an uplink 1470. The control information 1404 includes an acknowledgement/non-acknowledgement (ACK/NACK) 1404a, a channel quality indicator (CQI) 1404b, a pre-coding matrix indicator (PMI) 1404c, rank information 1404d, and a scheduling request (SR) 1404e.

The UE 1464 includes a multi-level embedded coding unit 1452. The multi-level embedded coding unit 1452 includes multiple single-level embedded coding units 1402.

The base station 1468 includes a multi-level embedded decoding unit 1456. The multi-level embedded decoding unit 1456 includes multiple single-level embedded decoding units 1426.

The UE 1464 may perform multi-level embedded coding with respect to some or all of the control information 1466 so that different types of control information 1466 may be transmitted simultaneously from the UE 1464 to the base station 1468. The base station 1468 may perform multi-level embedded decoding in order to decode the different types of control information 1466 that are transmitted.

Figure 15:
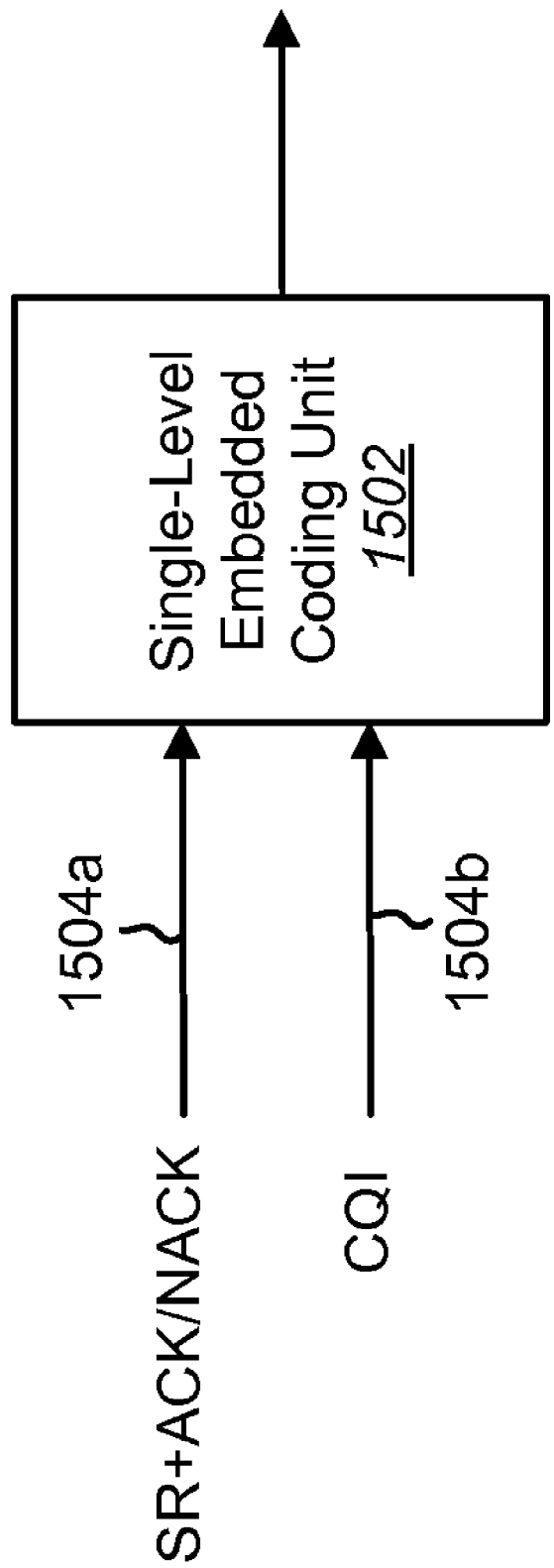
FIG. 15 illustrates an example of a single-level embedded coding unit performing a single-level embedded coding operation with respect to two different types of control information.

FIG. 15 illustrates an example of a single-level embedded coding unit 1502 performing a single-level embedded coding operation with respect to two different types of control information 1504. The first type of control information 1504a includes a combination of a scheduling request (SR) and an acknowledgement/non-acknowledgement (ACK/NACK). The second type of control information 1504b includes a channel quality indicator (CQI) 1504b.

In this example, the error protection requirements 122 of the control information 1504 may be as follows: SR=ACK/NACK>CQI. Because the error protection requirements 122 of the SR and the ACK/NACK are assumed to be equal, they may be concatenated and treated as a single type of information 1504a.

Figure 16:
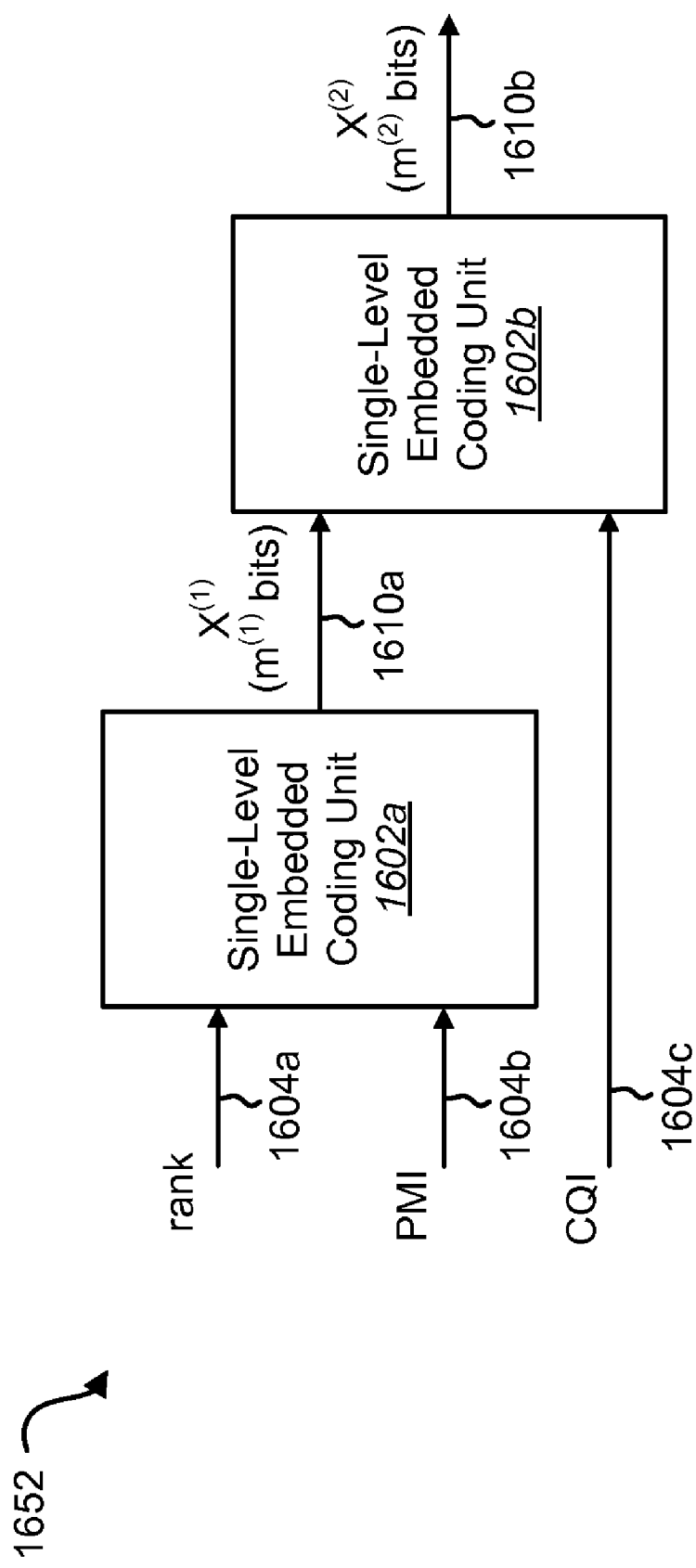
FIG. 16 illustrates an example of a multi-level embedded coding unit that performs multi-level embedded coding with respect to different types of control information.

FIG. 16 illustrates an example of a multi-level embedded coding unit 1652 that performs multi-level embedded coding with respect to different types of control information 1604. A first single-level embedded coding unit 1602a is shown performing a first single-level embedded coding operation with respect to rank information 1604a and a pre-coding matrix indicator (PMI) 1604b. The result of the first single-level embedded coding operation may include a first codeword 1610a, which is labeled $X^{(1)}$ in FIG. 16.

A second single-level embedded coding unit 1602b is shown performing a second single-level embedded coding operation with respect to the first codeword 1610a and a channel quality indicator (CQI) 1604c. The result of the second single-level embedded coding operation may include a second codeword 1610b, which is labeled $X^{(2)}$ in FIG. 16. In this example, the error protection requirements 122 of the control information 1604 may be as follows: rank>PMI>CQI.

Figure 17:
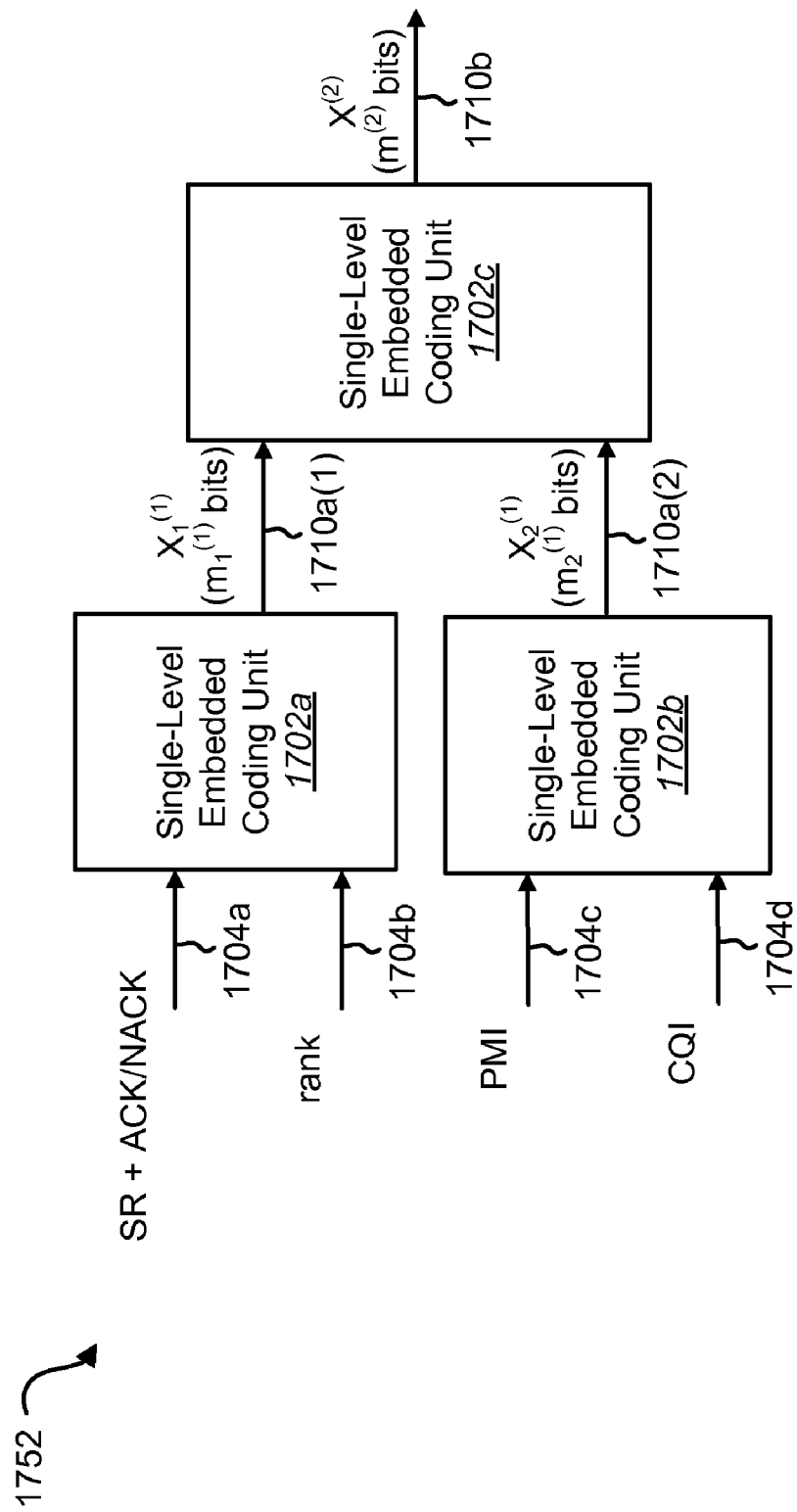
FIG. 17 illustrates another example of a multi-level embedded coding unit that performs multi-level embedded coding with respect to different types of control information.

FIG. 17 illustrates another example of a multi-level embedded coding unit 1752 that performs multi-level embedded coding with respect to different types of control information 1704. A first single-level embedded coding unit 1702a is shown performing a first single-level embedded coding operation with respect to a combination 1704a of a scheduling request (SR) and an acknowledgement/non-acknowledgement, and rank information 1704b. The result of the first single-level embedded coding operation may include a first level-1 codeword 1710a(1), which is labeled $X_1^{(1)}$ in FIG. 17.

A second single-level embedded coding unit 1702b is shown performing a second single-level embedded coding operation with respect to a pre-coding matrix indicator (PMI) 1704c and a channel quality indicator (CQI) 1704d. The result of the second single-level embedded coding operation may include a second level-1 codeword 1710a(2), which is labeled $X_2^{(1)}$ in FIG. 17.

A third single-level embedded coding unit 1702c is shown performing a third single-level embedded coding operation with respect to the first level-1 codeword 1710a(1) and the second level-1 codeword 1710a(2). The result of the third single-level embedded coding operation may include a level-2 codeword 1710b, which is labeled $X^{(2)}$ in FIG. 17. In this example, the error protection requirements 122 of the control information 1704 may be as follows: SR=ACK/NACK>rank>PMI>CQI.

Figure 18:
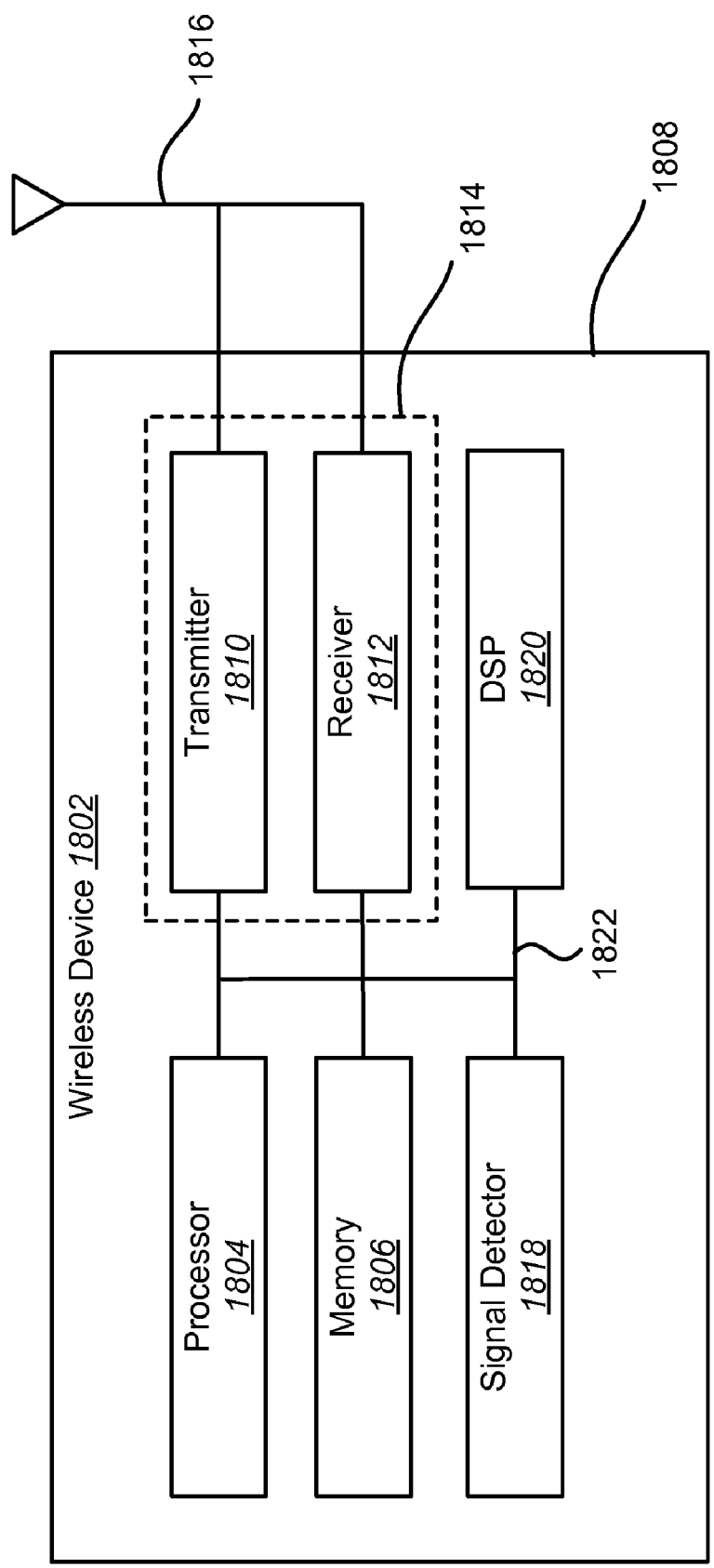
FIG. 18 illustrates various components that may be utilized in a wireless device.

FIG. 18 illustrates various components that may be utilized in a wireless device 1802. The wireless device 1802 is an example of a device that may be configured to implement the various methods described herein. The wireless device 1802 may be a UE 1464 or a base station 1468.

The wireless device 1802 may include a processor 1804 which controls operation of the wireless device 1802. The processor 1804 may also be referred to as a central processing unit (CPU). Memory 1806, which may include both read-only memory (ROM) and random access memory (RAM), provides instructions and data to the processor 1804. A portion of the memory 1806 may also include non-volatile random access memory (NVRAM). The processor 1804 typically performs logical and arithmetic operations based on program instructions stored within the memory 1806. The instructions in the memory 1806 may be executable to implement the methods described herein.

The wireless device 1802 may also include a housing 1808 that may include a transmitter 1810 and a receiver 1812 to allow transmission and reception of data between the wireless device 1802 and a remote location. The transmitter 1810 and receiver 1812 may be combined into a transceiver 1814. An antenna 1816 may be attached to the housing 1808 and electrically coupled to the transceiver 1814. The wireless device 1802 may also include (not shown) multiple transmitters, multiple receivers, multiple transceivers and/or multiple antenna.

The wireless device 1802 may also include a signal detector 1818 that may be used to detect and quantify the level of signals received by the transceiver 1814. The signal detector 1818 may detect such signals as total energy, pilot energy per pseudonoise (PN) chips, power spectral density, and other signals. The wireless device 1802 may also include a digital signal processor (DSP) 1820 for use in processing signals.

The various components of the wireless device 1802 may be coupled together by a bus system 1822 which may include a power bus, a control signal bus, and a status signal bus in addition to a data bus. However, for the sake of clarity, the various busses are illustrated in FIG. 18 as the bus system 1822.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for multi-level embedded coding, comprising:
   performing multiple single-level embedded coding operations in order to code multiple types of information;
   wherein each single-level embedded coding operation comprises embedding a first type of information into a codeword for the second type of information; and
   wherein embedding the first type of information into the codeword for the second type of information comprises determining a desired symbol distribution for a modulated codeword corresponding to the second type of information, and generating a codebook for coding the second type of information by choosing codewords that have the desired symbol distribution when modulated.

2. The method of claim 1, wherein the multiple single-level embedded coding operations are performed in a serial order.

3. The method of claim 1, wherein the multiple single-level embedded coding operations are performed partially in parallel.

4. The method of claim 1, wherein the multiple types of information have different error protection requirements.

5. The method of claim 1, wherein the method is implemented by a wireless device, and wherein the multiple types of information comprise control information that is transmitted to a base station.

6. The method of claim 5, wherein the control information comprises an acknowledgement/non-acknowledgement (ACK/NACK), a channel quality indicator (CQI), a pre-coding matrix indicator (PMI), rank information, and a scheduling request (SR).

7. The method of claim 1, wherein the multiple single-level embedded coding operations comprise a single-level embedded coding operation in which the first type of information is a combination of a scheduling request (SR) and an acknowledgement/non-acknowledgement (ACK/NACK), and the second type of information is a channel quality indicator (CQI).

8. The method of claim 1, wherein the multiple single-level embedded coding operations comprise:
   a first single-level embedded coding operation in which the first type of information is rank information, and the second type of information is a pre-coding matrix indicator (PMI); and
   a second single-level embedded coding operation in which the first type of information is a result of the first single-level embedded coding operation, and the second type of information is a channel quality indicator (CQI).

9. The method of claim 1, wherein the multiple single-level embedded coding operations comprise:
   a first single-level embedded coding operation in which the first type of information is a combination of a scheduling request (SR) and an acknowledgement/non-acknowledgement (ACK/NACK), and the second type of information is rank information;
   a second single-level embedded coding operation in which the first type of information is a pre-coding matrix indicator (PMI), and the second type of information is a channel quality indicator (CQI); and
   a third single-level embedded coding operation in which the first type of information is a first level-1 codeword that results from the first single-level embedded coding operation, and the second type of information is a second level-1 codeword that results from the second single-level embedded coding operation.

10. A wireless device that is configured for multi-level embedded coding, comprising:
    a processor;
    memory in electronic communication with the processor;
    instructions stored in the memory, the instructions being executable to perform multiple single-level embedded coding operations in order to code multiple types of information;
    wherein each single-level embedded coding operation comprises embedding a first type of information into a codeword for the second type of information; and
    wherein embedding the first type of information into the codeword for the second type of information comprises determining a desired symbol distribution for a modulated codeword corresponding to the second type of information, and generating a codebook for coding the second type of information by choosing codewords that have the desired symbol distribution when modulated.

11. The wireless device of claim 10, wherein the multiple types of information have different error protection requirements.

12. The wireless device of claim 10, wherein the multiple types of information comprise control information that is transmitted to a base station, and wherein the control information comprises an acknowledgement/non-acknowledgement (ACK/NACK), a channel quality indicator (CQI), a pre-coding matrix indicator (PMI), rank information, and a scheduling request (SR).

13. The wireless device of claim 10, wherein the multiple single-level embedded coding operations comprise a single-level embedded coding operation in which the first type of information is a combination of a scheduling request (SR) and an acknowledgement/non-acknowledgement (ACK/NACK), and the second type of information is a channel quality indicator (CQI).

14. The wireless device of claim 10, wherein the multiple single-level embedded coding operations comprise:
  a first single-level embedded coding operation in which the first type of information is rank information, and the second type of information is a pre-coding matrix indicator (PMI); and
  a second single-level embedded coding operation in which the first type of information is a result of the first single-level embedded coding operation, and the second type of information is a channel quality indicator (CQI).

15. The wireless device of claim 10, wherein the multiple single-level embedded coding operations comprise:
  a first single-level embedded coding operation in which the first type of information is a combination of a scheduling request (SR) and an acknowledgement/non-acknowledgement (ACK/NACK), and the second type of information is rank information;
  a second single-level embedded coding operation in which the first type of information is a pre-coding matrix indicator (PMI), and the second type of information is a channel quality indicator (CQI); and
  a third single-level embedded coding operation in which the first type of information is a first level-1 codeword that results from the first single-level embedded coding operation, and the second type of information is a second level-1 codeword that results from the second single-level embedded coding operation.

16. A computer-readable medium comprising executable instructions for:
  performing multiple single-level embedded coding operations in order to code multiple types of information;
  wherein each single-level embedded coding operation comprises embedding a first type of information into a codeword for the second type of information; and
  wherein embedding the first type of information into the codeword for the second type of information comprises determining a desired symbol distribution for a modulated codeword corresponding to the second type of information, and generating a codebook for coding the second type of information by choosing codewords that have the desired symbol distribution when modulated.

17. The computer-readable medium of claim 16, wherein the multiple types of information have different error protection requirements.

18. The computer-readable medium of claim 16, wherein the computer-readable medium is part of a wireless device, wherein the multiple types of information comprise control information that is transmitted to a base station, and wherein the control information comprises an acknowledgement/non-acknowledgement (ACK/NACK), a channel quality indicator (CQI), a pre-coding matrix indicator (PMI), rank information, and a scheduling request (SR).

19. The computer-readable medium of claim 16, wherein the multiple single-level embedded coding operations comprise a single-level embedded coding operation in which the first type of information is a combination of a scheduling request (SR) and an acknowledgement/non-acknowledgement (ACK/NACK), and the second type of information is a channel quality indicator (CQI).

20. The computer-readable medium of claim 16, wherein the multiple single-level embedded coding operations comprise:
  a first single-level embedded coding operation in which the first type of information is rank information, and the second type of information is a pre-coding matrix indicator (PMI); and
  a second single-level embedded coding operation in which the first type of information is a result of the first single-level embedded coding operation, and the second type of information is a channel quality indicator (CQI).

21. The computer-readable medium of claim 16, wherein the multiple single-level embedded coding operations comprise:
  a first single-level embedded coding operation in which the first type of information is a combination of a scheduling request (SR) and an acknowledgement/non-acknowledgement (ACK/NACK), and the second type of information is rank information;
  a second single-level embedded coding operation in which the first type of information is a pre-coding matrix indicator (PMI), and the second type of information is a channel quality indicator (CQI); and
  a third single-level embedded coding operation in which the first type of information is a first level-1 codeword that results from the first single-level embedded coding operation, and the second type of information is a second level-1 codeword that results from the second single-level embedded coding operation.

22. A method for multi-level embedded decoding, comprising:
  performing multiple single-level embedded decoding operations in order to decode multiple types of information;
  wherein each single-level embedded decoding operation comprises decoding a first type of information and a second type of information; and
  wherein decoding the first type of information comprises determining a symbol distribution within a codeword that corresponds to the second type of information and evaluating a decoding rule that depends on the symbol distribution.

* * * * *